W. H. Rogers.
Friction Match.

Nº 96,730.        Patented Oct. 12, 1869.

Witnesses.
A. W. Almquist
Alex S. Roberts

Inventor.
W. H. Rogers
Per Munn & Co

United States Patent Office.

WILLIAM H. ROGERS, OF NEW YORK, N. Y.

Letters Patent No. 95,730, dated October 12, 1869.

IMPROVEMENT IN FRICTION-MATCHES.

The Schedule referred to in these Letters Patent and making part of the same.

*To all whom it may concern:*

Be it known that I, WILLIAM H. ROGERS, of the city, county, and State of New York, have invented a new and useful Improvement in Friction-Matches; and I do hereby declare that the following is a full, clear, and exact description thereof, which will enable those skilled in the art to make and use the same, reference being had to the accompanying drawings, forming part of this specification.

This invention relates to a new and useful improvement in friction-matches, whereby they are rendered much more useful than they have hitherto been; and It consists in coating the matches below the igniting-end with an inflammable composition, as will be hereinafter more fully described.

In the accompanying drawing—

Similar letters of reference indicate corresponding parts.

Figure 1:
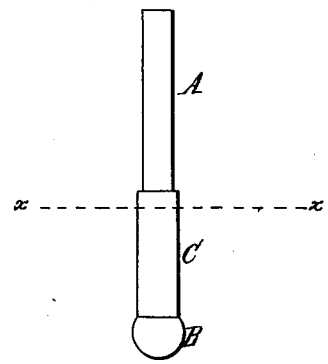
Figure 1 represents a view of a match constructed according to my invention.
Figure 2:
Figure 2 is a cross-section of fig. 1, through the line $y\ y$.

A is the match-stem, which may be made of wood, metal, glass, or any other suitable material.

B is the ignitible end, formed of the ordinary match-composition, which is ignited by friction in the usual manner.

Below the end B, and covering any desired portion of the stem A, is an inflammable composition coating, C.

It is well known that the common friction-match is greatly defective, as regards retaining the flame in a draught of air or in the wind, rendering it extremely difficult to carry a lighted match any distance, as a temporary light in a dark place, or to light a cigar in the open air, especially where there is the least wind.

The composition with which I cover a portion or the whole of the stem of the match, ignites from the friction-end B, and produces a strong, brilliant flame, entirely inextinguishable in the wind or in the strongest current of air.

It affords a very bright light, is not affected by dampness, and emits no disagreeable odor.

This improvement on the ordinary friction-match is of much importance for ordinary purposes, as, when the friction-end is once ignited, the match will not go out until all the coating C is consumed.

A large percentage—one-fourth at least—of ordinary matches is lost because the stem will not burn. With my coating, it is quite immaterial whether it burns or not. The reliability of the match, when the end is once ignited, is perfect.

To smokers the invention is of very great value, as the "light" is always sure in all situations, while the gas evolved by the combustion of the coating is rather agreeable than otherwise.

The composition with which my matches are coated consists of eight parts chlorate of potash, two of powdered charcoal, and five of dissolved rubber. This is applied to the strips of wood to be used in forming matches by compression in suitable dies.

This composition I use preferably, but neither it nor any method of putting it on forms the subject-matter of my invention. That has relation to the location of any inflammable coating below the ignitible end of the match.

Having thus described my invention,

What I claim as new, and desire to secure by Letters Patent, is—

A friction-match, with an inflammable coating applied below the ignitible end thereof, as and for the purpose specified.

WM. H. ROGERS.

Witnesses:
 GEO. W. MABEE,
 ALEX. F. ROBERTS.